United States Patent

Padgett et al.

[15] 3,660,684

[45] May 2, 1972

[54] LOW VOLTAGE LEVEL OUTPUT DRIVER CIRCUIT

[72] Inventors: Clarence W. Padgett; Robert W. Polkinghorn, both of Huntington Beach, Calif.

[73] Assignee: North American Rockwell Corporation

[22] Filed: Feb. 17, 1971

[21] Appl. No.: 116,050

[52] U.S. Cl. ..............................307/270, 307/251, 307/208, 307/269, 307/279

[51] Int. Cl. ..........................................................H03k 3/26

[58] Field of Search..................307/235, 238, 251, 279, 304, 307/270, 269

[56] References Cited

UNITED STATES PATENTS

| | | | |
|---|---|---|---|
| 3,243,606 | 3/1966 | Green et al. | 307/270 |
| 3,302,034 | 1/1967 | Nowell | 307/264 |
| 3,480,796 | 11/1969 | Polkinghorn et al | 307/251 |
| 3,539,835 | 11/1970 | Hinze | 307/264 |
| 3,575,613 | 4/1971 | Ebertin | 307/251 X |

*Primary Examiner*—John S. Heyman
*Attorney*—L. Lee Humphries, H. Fredrick Hamann and Robert G. Rogers

[57] ABSTRACT

The output is precharged to a voltage level slightly in excess of the threshold voltage level of the field effect transistors implementing the driver circuit. A bootstrap circuit is used for decreasing the time required to drive the output to the voltage level. A feedback circuit from the output disables the bootstrap circuit for limiting the output voltage level and for reducing additional power consumption in the circuit after the output has been driven to the required voltage level. An input evaluation circuit changes the output voltage level or permits it to remain unchanged as a function of the input voltage level.

3 Claims, 1 Drawing Figure

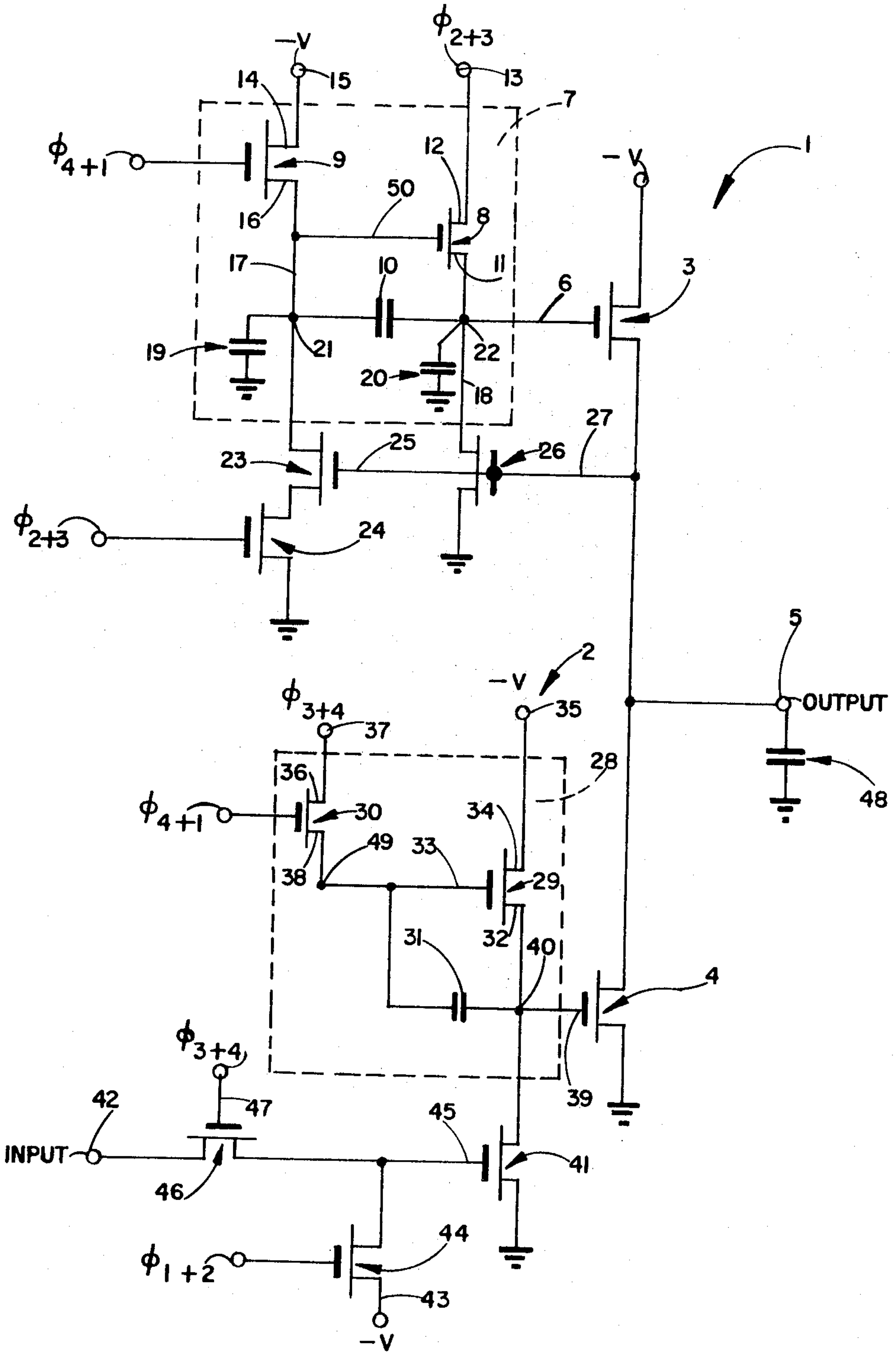
INVENTORS
CLARENCE W. PADGETT
BY ROBERT W. POLKINGHORN
Robert G. Rogers
ATTORNEY

LOW VOLTAGE LEVEL OUTPUT DRIVER CIRCUIT

BACKGROUND OF THE INVENTION

1. Field of the Invention

The invention relates to a low voltage level output driver circuit and more particularly to such a circuit including a field effect transistor precharge circuit which quickly drives the output to a relatively low voltage level and feeds back the output voltage for limiting the output to the required voltage level and for reducing power consumption in the circuit.

2. Description of Prior Art

Driver circuits ordinarily must be made large enough to permit a rapid charge and discharge of the capacitances at various nodes within the circuit. In addition, the field effect transistor devices of the circuit are required to remain on relatively long periods of time so that power consumption in operating the circuit is substantially increased. In certain embodiments, the voltage levels, either negative or positive, are relatively large so that additional time and power are consumed in charging and/or discharging the output load capacitances as well as the capacitances at each node of the circuit each time the voltage levels are changed during the operation of the circuit.

Most driver circuits operate cyclically such that during one phase, the output is precharged to a desired voltage level representing a first logic state. During a subsequent phase time, the output is either changed to a second voltage level representing a second logic state or it remains unchanged as a function of an input voltage.

The present driver circuit provides the necessary functions of a driver circuit while substantially minimizing the power consumption, increasing speed, and reducing the output voltage level from relatively high to relatively low voltage levels which are referenced to the threshold voltage levels of the field effect transistor driver circuit implementing the output driver circuit and other circuits formed simultaneously in the same semiconductor chip. The output of the driver circuit is also nodable with the outputs of other driver circuits.

SUMMARY OF THE INVENTION

Briefly, the invention comprises a field effect transistor driver circuit including a field effect transistor precharge circuit for driving the output to a first voltage level slightly in excess of the threshold voltage level of the field effect transistors implementing the driver circuit, during a first phase time of the circuit operation. The precharge circuit includes field effect transistors responsive to the output voltage level for disabling the precharge circuit when the output is driven to the relatively low voltage level. As a result of the disabling the precharge circuit, power dissipation is curtailed and the driver output can be noded with other drivers to obtain a "wired AND" logic function. The voltage level at the output is required to be in excess of the threshold voltage levels of the devices implementing the driver circuit as well as other circuits in the semiconductor chip. An output voltage of two thresholds is satisfactory.

In the preferred embodiment, a bootstrap driver circuit is included with the precharge circuit for providing an increased drive voltage on the gate electrode of a load output field effect transistor. As a result, the output is quickly driven to the required voltage level. A voltage level slightly in excess of the threshold voltage level of the field effect transistors in the chip required to insure an adequate drive on the gate electrodes of the field effect transistors. In other driver circuits, the output voltage level is made relatively large to insure that the proper drive voltage is available for other field effect transistors. This large output voltage results in either longer switching times, or greater power dissipation, or both.

The driver circuit also includes a sampling circuit for sampling the input after the output is precharged. A field effect transistor in series with the load field effect transistor and electrical ground, forming an output stage, becomes conductive or remains nonconductive as a function of the input voltage level. The output voltage therefore changes or remains unchanged as a function of the input voltage level.

Ordinarily the output is precharged to a voltage level representing a first logic state, for example, logic one, during a first phase time of the circuits operating cycle. In that embodiment, when the input is a logic one during a subsequent phase time of the circuit's operation, the output remains at a voltage level representing a logic one state. The subsequent phase may be described as a sampling, or input evaluation phase. When the input is a logic zero, the output is changed to a second voltage level, for example, electrical ground, representing the logic zero.

Therefore it is an object of this invention to provide a relatively improved low voltage level field effect transistor output driver circuit.

It is another object of this invention to provide an improved low level output driver circuit using a precharge circuit which is disabled by the output voltage level after the output has been driven to a certain voltage level adequate to provide a drive voltage for field effect transistors implementing the driver circuit.

It is another object of this invention to provide an output driver circuit using an output precharge circuit for quickly driving the output to a relatively low voltage level referenced to the threshold voltage levels of the field effect transistors implementing the driver circuit as well as implementing other circuits within the semiconductor chip embodying the driver circuit.

Another object of this invention is to provide a field effect transistor output driver in which the power dissipation is reduced by disabling the precharge circuit of the driver circuit after the output is charged to a relatively low voltage level.

A still further object of this invention is to provide a field effect transistor output driver using a precharge circuit for increasing the speed of operation of the output driver circuit.

Another object of this invention is to provide a field effect transistor output driver circuit including a precharge circuit partially controlled by the output feedback and clock signals for enabling the circuit to operate at a relatively higher speed without using relatively large field effect transistor devices which increases the chip area required for the circuit.

Another object of this invention is to provide an improved nodable field effect transistor output driver.

These and other objects of this invention will become more apparent when taken in connection with the description of the drawings, a brief description of which follows.

BRIEF DESCRIPTION OF DRAWINGS

The FIGURE is a schematic diagram of one embodiment of the invention showing an output precharge circuit and an input sampling circuit implementing a field effect transistor output driver circuit.

DESCRIPTION OF PREFERRED EMBODIMENT

The FIGURE illustrates precharge circuit 1 and input sampling circuit 2 implementing an output field effect transistor driver. Field effect transistors 3 and 4 form a push-pull stage for the output driver. Output 5 is connected at a common point between the field effect transistor 3 and 4.

The drive voltage for the gate electrode 6 of field effect transistor 3 is provided by a bootstrapped driver 7 comprising field effect transistor 8, field effect transistor 9, and feedback capacitor 10 connected from source electrode 11 to gate electrode 50 of field effect transistor 8. The drain electrode 12 is connected to clock terminal 13 for clock signal $\phi_{2+3}$. The capacitances along the lines 17 and 18 are identified by capacitors 19 and 20 connected from the nodes 21 and 22 to electrical ground.

The drain electrode 14 of field effect transistor 9 is connected to terminal 15 for voltage source −V. The source electrode 16 is connected to the gate electrode 50 of field effect transistor 8.

The precharge circuit also includes field effect transistor 23 and field effect transistor 24 gated by clock signal $\phi_{2+3}$ connected between node 21 and electrical ground. The gate electrode 25 of field effect transistor 23 is connected to the output 5 for receiving feedback voltage from the output. Field effect transistor 26 is connected between node 22 and electrical ground and also receives feedback voltage from the output on its gate electrode 27. Field effect transistors 23 and 26 disable the precharge circuit when the output has been driven to a voltage level in excess of the threshold voltage levels of the field effect transistors 23 and 26. Ordinarily a voltage slightly less than two thresholds and in excess of one threshold is sufficient to turn field effect transistors 23 and 26 on for disabling the precharge circuit 1.

Field effect transistor 24 is on during $\phi_{2+3}$ time, when the output is being precharged for enabling the capacitance at node 21 to be discharged. Field effect transistor 26 enables the capacitance at node 22 to be discharged. At other phase times, field effect transistor 24 is turned off for enabling capacitor 10 to be precharged during $\phi_{4+1}$ time for providing the bootstrap effect described subsequently.

The input sampling circuit also includes a bootstrap driver 28 comprising field effect transistors 29, 30, and feedback capacitor 31 connected between source electrode 32 of field effect transistor 29 and gate electrode 33. The drain electrode 34 of field effect transistor 29 is connected to voltage source −V at terminal 35. The drain electrode 36 of field effect transistor 30 is connected to terminal 37 for clock signal $\phi_{3+4}$. Its source electrode 38 is connected to the gate electrode 33 of field effect transistor 29.

The gate electrode 39 of field effect transistor 4 is connected to common point 40 between field effect transistors 29 and 41. Field effect transistor 4 is driven by the voltage at node 40.

Field effect transistor 41 receives a drive from either input terminal 42 or terminal 43 for voltage source −V, depending on the phase of the circuit operation. For example, during $\phi_{1+2}$ time, field effect transistor 44 is turned on for driving the gate electrode 45 of field effect transistor 41 approximately to −V. The voltage may be reduced by the threshold voltage drop across transistor 44 as is well known. However, during $\phi_{3+4}$, the gate electrode 45 receives a drive voltage through field effect transistor 46 which is turned on during $\phi_{3+4}$ by the clock signal on its gate electrode 47.

In operation, during $\phi_{4+1}$, field effect transistor 9 is turned on for applying approximately −V to the gate electrode 50 of field effect transistor 8 and across capacitor 10. Field effect transistor 8 is turned on by the negative voltage level on its gate electrode for connecting node 22 to the ground voltage level of $\phi_{2+3}$ during the $\phi_{4+1}$ clock interval. Field effect transistor 3 is turned off.

During $\phi_{2+3}$, field effect transistor 9 is turned off and field effect transistor 8 remains on. The $\phi_{2+3}$ clock signal becomes true so that node 22 is changed from approximately ground to approximately the voltage level of clock $\phi_{2+3}$. The negative increase in the voltage level at node 22 is fedback across capacitor 10 for boosting the drive voltage on gate electrode 50 of field effect transistor 8. The increase in the drive voltage of field effect transistor 8 substantially enhances the conduction of the transistor for driving node 22 to approximately the voltage level of the $\phi_{2+3}$ clock.

Electrode 6 of field effect transistor 3 is connected to node 22. As a result, when node 22 is driven negative during $\phi_{2+3}$, field effect transistor 3 is turned on for applying a negative voltage level to the output 5. The capacitor 48 represents the load capacitance at the output. The increased drive voltage on the gate electrode 6 also enhances the conduction of field effect transistor 3 for rapidly driving the output 5 towards the −V voltage level.

The output voltage however is fedback to the gate electrodes 25 and 27 of field effect transistors 23 and 26. The field effect transistors may be designed in size relative to the field effect transistor 8 to establish the desired output voltage level at output 5. Since the devices are usually relatively small, a voltage level in excess of one threshold is required to render the devices sufficiently conductive for rapid discharge of capacitors 19 and 20 at nodes 21 and 22. Ordinarily, a drive voltage of less than two thresholds is sufficient. Therefore, when the output voltage is in excess of one threshold and, usually less than two thresholds, the field effect transistors 23 and 26 become sufficiently conductive for rapidly discharging the capacitance at nodes 21 and 22 to electrical ground. It is pointed out that field effect transistor 24 is also turned on during $\phi_{2+3}$ for enabling node 21 to discharge through transistors 23 and 24.

Since the node 22 is discharged to electrical ground, the driver voltage for gate electrode 6 of field effect transistor 3 is removed thereby turning field effect transistor 3 off. Since node 21 is discharged to electrical ground, the drive voltage for gate electrode 50 of field effect transistor 8 is removed so that field effect transistor 8 is also turned off.

When the output has been charged to a voltage level in excess of one threshold, the precharge circuitry is disabled for reducing the power consumption of the circuit. Usually the charge of the output, and the time necessary to discharge nodes 21 and 22 occurs well within the period of the $\phi_{2+3}$ clock.

There are two other reasons for disabling the precharge circuitry prior to the time (phase) when the input on terminal 42 is sampled. The first reason is to prevent transistors 3 and 4 from being turned on at the same time, which condition would substantially increase the power dissipation in the transistors 3 and 4, and also increase the time required for transistor 4 to conditionally discharge load capacitor 48, node 5, to electrical ground.

The second reason for disabling the precharge circuitry is that the output of the driver, node 5, may be noded to the output of one or more other drivers of the same design as described herein. By disabling the precharge circuitry of all of the noded drivers, transistor 4 can conditionally discharge load capacitor 48, node 5, to electrical ground in substantially less time, thus enhancing the speed of the driver.

After the output has been precharged, the input signal on terminal 42 is evaluated, or sampled. The output either changes or remains unchanged as a function of the voltage level on the input terminal 42.

Initially, however, $\phi_{1+2}$ renders field effect transistor 44 conductive for applying approximately −V to gate electrode 45 of field effect transistor 41. As a result, node 40 is connected to electrical ground for holding field effect transistor 4 off. Therefore, field effect transistor 4 is held off during the time the output is being charged to a voltage level through field effect transistor 3.

During $\phi_3$ of the $\phi_{3+4}$ clock, the input terminal 42 is precharged to a voltage level representing for example a logic one. Since field effect transistor 46 is turned on during $\phi_3$, gate electrode 45 also receives the voltage level and field effect transistor 41 is turned on for connecting node 40 to electrical ground.

During $\phi_4$ time, field effect transistor 30 turns on for connecting node 49 to the $\phi_{3+4}$ clock signal which is true during $\phi_4$ time. As a result, field effect transistor 29 becomes conductive and capacitor 31 charges to approximately the clock level approximately the $\phi_{3+4}$ clock level.

In addition, during $\phi_4$ time of the $\phi_{3+4}$ clock, the voltage level at input 42 is conditionally changed. In other words, a logic network connected to terminal 42 may be true or false so that the voltage level on terminal 42 changes accordingly. For the present example, it is assumed that terminal 42 remains at a logic one voltage level during $\phi_4$ such that field effect transistor 41 remains on during $\phi_4$ time. Therefore, node 40 remains at electrical ground and field effect transistor 4 remains off. Therefore, when the input terminal 42 is true, or logic one, during $\phi_4$, the output 5 does not change. Since the output was charged to a voltage level representing logic one, during $\phi_{2+3}$, and since the input was true during $\phi_{3+4}$, the output represents the state of the input without inversion.

Assuming however that the input changes from logic one to logic zero during $\phi_4$, the voltage level on gate electrode 45 goes to electrical ground and field effect transistor 41 turns off. Therefore, during $\phi_4$ time, node 40 changes from electrical ground towards −V since field effect transistor 29 is conductive. The change in the voltage level at node 40 is fedback across capacitor 31 as indicated in connection with bootstrap driver 7, for substantially enhancing the conduction of field effect transistor 29. Therefore, the drive voltage for field effect transistor 4 is substantially increased to approximately −V. The threshold drop across field effect transistor 29 is overcome by the feedback voltage across capacitor 31.

During the $\phi_1$ time of $\phi_{4+1}$, field effect transistor 30 remains on for connecting node 49 to electrical ground at terminal 37. The $\phi_{3+4}$ clock is at electrical ground during $\phi_1$ time.

In the preferred embodiment of the low level driver circuit shown in the figure, P-channel MOS field effect transistors may be utilized. For that embodiment, the voltage levels of the clock signals and the voltage sources are negative. It should be understood that other field effect transistors including N-channel devices may also be used.

We claim:

1. A low level output driver circuit having an operation cycle determined by multiple phase clock signals, said cycle having an output precharge interval and an input evaluation interval occurring during each cycle of said multiple phase clock signals, said driver circuit comprising, a load field effect transistor connected between the output and a voltage source, an output precharge circuit for charging the output to a relatively low voltage level during an output precharge operating interval of the driver, an input evaluation circuit for evaluating inputs to said low level output driver circuit during an evaluation interval of the operation of the driver.

said precharge circuit including a first field effect transistor connected between the gate electrode of said load field effect transistor and a second voltage level and having its gate electrode connected to the output for disabling said output precharge circuit after the output has been charged to said relatively low voltage level during the output precharge operating interval, Said precharge circuit further including a first bootstrap field effect transistor driver connected between the gate electrode of said load field effect transistor and a voltage source for providing a drive voltage to said gate electrode during said output precharge operating interval before said precharge circuit is disabled by said first field effect transistor.

2. The driver circuit recited in claim 1 wherein said output precharge circuit further includes second and third field effect transistors connected in electrical series between the gate electrode of said field effect transistor bootstrap driver and a second voltage level for operating in conjunction with said first field effect transistor for disabling said precharge circuit during the output precharge operation interval after said output has been charged to said relatively low voltage level, said second field effect transistor having its gate electrode connected to the output and third field effect transistor having its gate electrode connected to a multiple phase clock signal for rendering said third field effect transistor conductive during the output precharge interval and nonconductive during other intervals of the operating cycle, and a fourth field effect transistor connected between a voltage source and the gate electrode of the first bootstrap field effect transistor driver for providing a voltage to the gate electrode during a phase prior to the output precharge interval, said third phase effect transistor being nonconductive during said preceding phase for enabling said voltage level to be applied to the gate electrode of said first bootstrap field effect transistor driver.

3. The driver circuit recited in claim 2 further including a fifth field effect transistor connected between the output and a second voltage level, a second bootstrap field effect transistor driver for driving the gate electrode of said fifth field effect transistor, said driver including capacitance, a sixth field effect transistor for precharging the capacitance of the second bootstrap field effect transistor driver during the input evaluation interval, and means responsive to the input voltage level during the input evaluation interval for controlling the output of said second bootstrap field effect transistor driver whereby the fifth field effect transistor is rendered conductive or nonconductive as a function of the input voltage level.

* * * * *